United States Patent Office 3,783,141
Patented Jan. 1, 1974

3,783,141
3,7,9,11-TETRAMETHYL-10-ALKOXY OR BENZYL-
OXYTRIDECA - 2,7,11 - TRIENOIC ACIDS AND
ESTERS CONTAINING A 4 POSITION TRIPLE
OR DOUBLE BOND
Beverly Ann Pawson, Montclair, and Gabriel Saucy,
Essex Fells, N.J., assignors to Hoffmann-La Roche
Inc., Nutley, N.J.
No Drawing. Filed Dec. 17, 1971, Ser. No. 209,386
Int. Cl. C07c 59/18, 69/66; A01n 9/24
U.S. Cl. 260—410.9 R                     16 Claims

ABSTRACT OF THE DISCLOSURE

Novel 3,7,9,11-tetramethyl-10-methoxy-trideca-2,7,11-trienoic acid esters containing a triple or double bond at the 4-position which are useful as insect hormonal agents prepared from the condensation product of tiglic aldehyde with methyl propenyl ether.

SUMMARY OF THE INVENTION

In accordance with this invention, it has been found that compounds of the formula:

$$CH_3-CH=\underset{13\ 12\ 11}{\overset{CH_3}{\underset{|}{C}}}-\underset{10}{\overset{|}{\underset{OR_1}{C}H}}-\underset{9}{\overset{CH_3}{\underset{|}{C}H}}-\underset{8\ 7}{CH}=\underset{6}{\overset{CH_3}{\underset{|}{C}}}-\underset{5}{\overset{|}{\underset{A}{C}H_2}}-\underset{4}{\overset{|}{\underset{B}{C}}}=C-\underset{3\ 2}{\overset{CH_3}{\underset{|}{C}}}=CH-\underset{1}{\overset{O}{\overset{||}{C}}}-OR \quad (I)$$

wherein R is lower alkyl and $R_1$ is lower alkyl or benzyl; A and B individually are hydrogen or taken together form a carbon to carbon bond;

are useful as insect hormonal agents and bactericides.
The compounds of Formula I are prepared from the condensation product of a compound of the formula:

$$CH_3-CH=C-\underset{CH_3}{\overset{OR_1}{\underset{|}{C}H}}\diagdown OR_1 \quad (II)$$

wherein $R_1$ is as above;

$$CH_3-CH=CH-OR_1 \quad (III)$$

wherein $R_1$ is as above;
via an intermediate of the formula:

$$CH_3-CH=\underset{8\ 7}{\overset{CH_3}{\underset{|}{C}}}-\underset{6}{\overset{|}{\underset{OR_1}{C}H}}-\underset{5\ 4}{\overset{CH_3}{\underset{|}{C}H}}-CH=\underset{3\ 2}{\overset{CH_3}{\underset{|}{C}}}-\underset{1}{\overset{O}{\overset{||}{C}}}-OR_3 \quad (III-A)$$

wherein $R_3$ is lower alkyl; and $R_1$ is as above.
In accordance with this invention, it has been discovered that the compound of Formula I is also useful as a bactericide.
The compounds of Formula I can be in the form of the threo or erythro isomer or mixtures thereof. Where the compound of Formula I is in the erythro form, the compound of Formula I has the formula:

$$CH_3-CH=\overset{CH_3}{\underset{\overset{|}{H}}{C}}-\overset{OR_1}{\underset{\overset{\equiv}{H}}{C}}-\overset{CH_3}{\underset{|}{C}}-CH=\overset{CH_3}{\underset{|}{C}}-CH_2-\overset{|}{\underset{A}{C}}=\overset{|}{\underset{B}{C}}-\overset{CH_3}{\underset{|}{C}}=CH-\overset{O}{\overset{||}{C}}-OR \quad (I-A)$$

wherein R, $R_1$, and A and B are as above.
On the other hand, where the compound of Formula I has the threo form, the compound of Formula I has the following formula:

$$CH_3-CH=\overset{CH_3}{\underset{\overset{|}{R_1O}}{C}}-\overset{H}{\underset{\overset{\equiv}{H}}{C}}-CH=\overset{CH_3}{\underset{|}{C}}-CH_2-\overset{|}{\underset{A}{C}}=\overset{|}{\underset{B}{C}}-\overset{CH_3}{\underset{|}{C}}=CH-\overset{O}{\overset{||}{C}}-OR \quad (I-B)$$

wherein R, $R_1$, A and B are as above.

The compounds of Formula I-A and I-B can be in either the d- or l-optically active form or can be present as a racemic mixture thereof.
Where the bond in the 4-position of the compound of Formula I is an olefinic double bond, the compound of both Formulae I-A and I-B can exist in either the 4-trans form or in the 4-cis form or as a mixture thereof. Also, the double bonds in the 2, 7 and 11-positions of the compound of Formulae I, I-A or I-B can be either a cis double bond or a trans double bond or be a mixture of the 2, 7 and 11 cis and trans isomers.

DETAILED DESCRIPTION

The term "lower alkyl" as used throughout this application comprehends both straight and branched chain hydrocarbon groups containing from 1 to 6 carbon atoms such as methyl, ethyl, propyl, isopropyl, etc. The term "halogen" includes all four halogens, i.e., iodine, bromine, chlorine and fluorine with iodine, bromine and chlorine being preferred.
The term "aryl" as used throughout the application, includes mono-nuclear aryl groups such as phenyl which can be unsubstituted or substituted in one or more positions with lower alkyl, halogen, lower alkoxy, amino, nitro, mono and dilower alkyl amino, etc., or polynuclear aryl groups such as naphthyl, anthryl, phenanthryl, azulyl, etc., which may be substituted with one or more of the aforementioned groups. The preferred aryl radical is phenyl.
The term "mono and dilower alkyl amino" as used throughout the application, includes mono and dilower alkyl amino groups wherein the lower alkyl moieties contain from 1 to 6 carbon atoms such as methyl, ethyl, isopropyl, etc. The term "lower alkoxy" comprehends lower alkoxy groups containing from 1 to 6 carbon atoms such as methoxy, propoxy, ethoxy, etc., preferably methoxy. The term "lower alkylenedioxy" as used throughout the specification, designates lower alkylenedioxy groups containing from 2 to 6 carbon atoms. Especially preferred are the alkylenedioxy groups such as ethylenedioxy.
The numbering of the chain in the formulas given in this application is shown for the purpose of convenience.
In the structural formulas given throughout the application the substituents which are attached to the molecule above the plane of the molecule are designated by ▼, and the substituents which are attached to the molecule below the plane of the molecule are designated by ≡.
The erythro isomers which are set forth throughout this application designate those isomers which have the structure:

$$CH_3-CH=\overset{CH_3}{\underset{\overset{|}{H}}{C}}-\overset{OR_1}{\underset{\overset{\equiv}{H}}{C}}-R'$$

wherein R' is a hydrocarbon residue; and $R_1$ is as above.
The threo isomers which are set forth throughout this application designate the isomers which have the following structure:

$$CH_3-CH=\overset{CH_3}{\underset{\overset{|}{R_1O}}{C}}-\overset{H}{\underset{\overset{\equiv}{H}}{C}}-R'$$

wherein R' and $R_1$ are as above.
The compounds of Formula I are especially useful against insects, particularly linden bug. The compound of Formula I substantially inhibits adult formation of the linden bug at dosages of 10 mcg./pupa and greater.
In contrast to most of the known pest-control agents which kill, disable or repell the pests by acting as contact-poisons and feed-poisons, the compounds of Formula I above prevent maturation an proliferation of these pests by interfering with their hormonal system. In insects, for example, the transformation to the imago, the laying of viable eggs and the development of laid normal eggs is disturbed. Furthermore, the sequence of generations is interrupted and the insects are indirectly killed.

The compounds of Formula I above are particularly non-toxic to vertebrates. Moreover, these compounds are readily degraded and the risk of accumulation is therefore excluded. Therefore, these compounds can be used without fear or danger in the control of pests in animals; plants; foods; and textiles.

Generally, in controlling invertebrate animals, the compounds of Formula I are applied to the material to be protected, e.g., foodstuffs, feeds, textiles, plants, in concentrations of from about $10^{-3}$ to $10^{-6}$ gm./cm.$^2$ of the material to be protected. Generally, it is preferred to utilize the compounds of Formula I above in a composition with a suitable inert carrier. Any conventional inert carrier can be utilized.

The compounds of Formula I can, for example, be used in the form of emulsions, suspensions, dusting agents, solutions or aerosols. In special cases, the materials to be protected (e.g., foodstuffs, feeds, textiles and the like) can also be directly impregnated with the appropriate compound or with a solution thereof. Moreover, the compounds can also be used in a form which only releases them by the action of external influences (e.g., contact with moisture) or in the animal body itself. It is also possible to use the compounds in admixture with other known pesticides.

The compounds of Formula I above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes; ketones such as methyl ethyl ketone; or chlorinated hydrocarbons such as tetrachloroethylene, tetrachlorobenzene, and the like. Such sprays suitably have a concentration of the compound of Formula I of .01% to 5% by weight, with a concentration .1% being preferred. The compounds of Formula I above can also be prepared in forms suitable for dilution with water to form aqueous liquids such as, for example, emulsion concentrates, pastes or powders. The compounds of Formula I above can be combined with solid carriers for making, dusting or strewing powders as, for example, talc, kaolin, bentonite, calcium carbonate, calcium phosphate, etc. The compositions containing the compounds of Formula I above can contain, if desired, emulsifiers, dispersing agents, wetting agents, or other active substances such as fungicides, bactericides, nematocides, fertilizers and the like. The materials which are to be protected act as bait for the insect. In this manner, the insect, by contacting the material impregnated with a compound of Formula I above, also contacts the compound itself.

Compounds of Formula I are also useful as bactericides, particularly against such bacteria as *Escherichia coli, Actinomyces cellulosae, Staphylococcus aureaus,* and *Bacillus simplex.*

The compound of Formula III-A is produced via the condensation product of a compound of Formula II with a compound of Formula III. This condensation product has the formula:

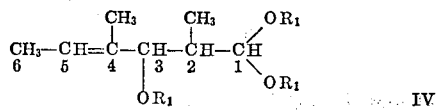

wherein $R_1$ is as above.

The compound of Formula III is reacted with the compound of Formula II in the presence of an acid catalyst. In carrying out this reaction, any of the conventional acid catalysts can be utilized. Among the preferred acid catalysts are included the Lewis acids such as zinc chloride, aluminum chloride and boron trifluoride. Generally, this reaction is carried out in an inert solvent. Any conventional inert organic solvent can be utilized for carrying out this reaction. Among the preferred inert organic solvents are included solvents such as ethyl acetate. In carrying out this reaction, temperature and pressure are not critical and this reaction can be carried out at room temperature and atmospheric pressure. Generally, it is preferred to utilize temperatures of from 0° C. to the reflux temperature of the reaction medium.

If the double bond in the starting material of Formula II is a trans double bond, the double bond at the 4-position in the compound of Formula IV is also a trans double bond. This trans configuration is carried through the process so that the compound of Formula III-A has a 6-trans configuration and the compound of Formula I has an 11-trans configuration. On the other hand, if the double bond in the compound of Formula II is a cis double bond, the double bond at the 4-position of the compound of Formula IV is also a cis double bond. This double bond is also carried through the entire process so that the compound of Formula III-A has a 6-cis configuration and the compound of Formula I has an 11-cis configuration. If the compound of Formula II is a mixture of cis and trans isomers, the mixture is carried through the process so that the compound of Formula IV is a 4-cis/trans mixture, the compound of Formula III-A is a 6-cis and trans mixture and the compound of Formula I is a 11-cis and trans mixture.

The acetals of Formula IV are selectively hydrolyzed by acid hydrolysis to produce an aldehyde of the formula:

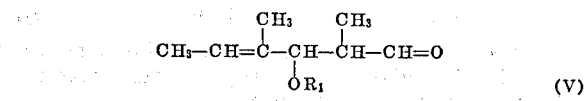

wherein $R_1$ is as above.

This selective hydrolysis is carried out by treating the aldehyde of Formula V above with an aqueous solution containing 1% to 10% by weight of sulfuric acid in the presence of an ether solvent. Any conventional ether solvent can be utilized. The preferred ether solvent is tetrahydrofuran. Generally this selective hydrolysis is carried out at temperatures of from 0 to 60° C.

In the next step of the process, the compound of Formula V is reacted with a phosphorus ylide of the formula:

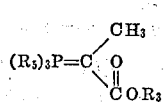

wherein $R_3$ is as above; and $R_5$ is aryl or dilower alkyl amino;

to produce the compound of Formula III-A.

Reaction between the phosphorus ylide and the compound of Formula V to produce the compound of Formula III-A is carried out by heating these reactants in an inert organic solvent. In carrying out this reaction, any conventional inert organic solvent can be utilized. Among the conventional inert organic solvents which can be utilized in accordance with this invention are included aprotic solvents such as benzene, toluene, etc., or polar protic solvents such as ethanol, methanol, etc. In carrying out this reaction, reflux temperatures are generally utilized.

The erythro isomer of the compound of Formula III-A has the formula:

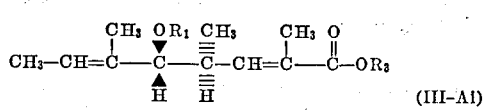

wherein $R_3$ is as above;

and the threo isomer of the compound of Formula III-A has the formula:

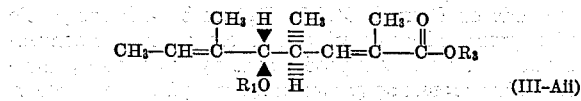

(III-Aii)

wherein $R_3$ is as above.

The reaction of the compound of Formula V with the phosphorus ylide can produce a double bond at the 2-position which either has a trans or cis configuration depending on the solvent utilized. Where a polar protic solvent such as a lower alkanol is used, formation of the 2-cis isomer is favored. On the other hand where an aprotic solvent such as benzene is used, formation of the 2-trans isomer is favored. Where a mixture of aprotic and polar protic solvents are utilized, a mixture of the 2-cis trans isomers of Formula III-A occurs. Therefore, both the compound of Formula III-Ai and the compound of Formula III-Aii can exist as 2-cis or 2-trans isomers or as a mixture of the 2-cis and 2-trans isomers.

Both the compound of Formula III-Ai and the compound of Formula III-Aii can also exist as optically active d- or l-isomers or can exist as a racemic mixture thereof.

The erythro and threo isomers of Formula III-A (Formula III-Ai and Formula III-Aii) can be separated by conventional means, such as column chromatography, vapor phase chromatography or fractional distillation. This separation can also take place with any of the intermediates produced in the conversion of the compound of Formula III-A to the compound of Formula I.

Both the erythro and threo isomers of the esters of Formula III-A can exist in the optically active d- or l-forms or as a racemic mixture. If the threo or erythro isomers exist as a racemic mixture, these racemic mixtures can be resolved by conventional procedures such as by reacting the esters of Formula III-Ai or Formula III-Aii, after hydrolysis of the ester to form the acid, with an optically active compound to afford a mixture of optically active diastereomeric derivatives, separating the diastereomers by methods known per se such as, for example, crystallization or chromatography and hydrolyzing the diastereomer to afford the desired enantiomer of the corresponding acid of the Formula III-Ai or Formula III-Aii. This optically active acid can be esterified to form the desired enantiomer of the ester of Formula III-Ai or Formula III-Aii. Suitable optically active materials for preparing diastereomers of the compounds of the Formula III-Ai or Formula III-Aii are the optically active bases such as α-methylbenzylamine, α-methylnaphthylamine, quinine, morphine, etc. Any of the procedures conventional in resolving compounds utilizing these bases can be utilized to resolve the compounds of the Formula III-Ai or Formula III-Aii. Also resolution can take place, if desired, with any of the intermediates produced in the conversion of the compound of the Formula III-A to the compound of the Formula I utilizing conventional resolution procedures.

The compound of Formula III-A which can exist as a mixture of threo and erythro or in these isomeric forms, i.e., the compounds of Formulae III-Ai, or III-Aii, can be converted to the compound of Formula I where, if A and B are hydrogen, the double bond has a 4-cis configuration, i.e., a compound of the formula:

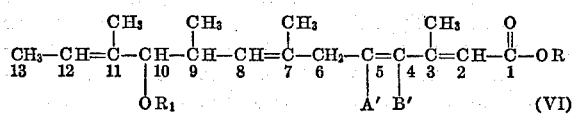

(VI)

wherein R and $R_1$ are as above; and A' and B' are individually hydrogen having a 4-cis double bond or taken together form a carbon to carbon bond;

by the following reaction scheme:

III-A

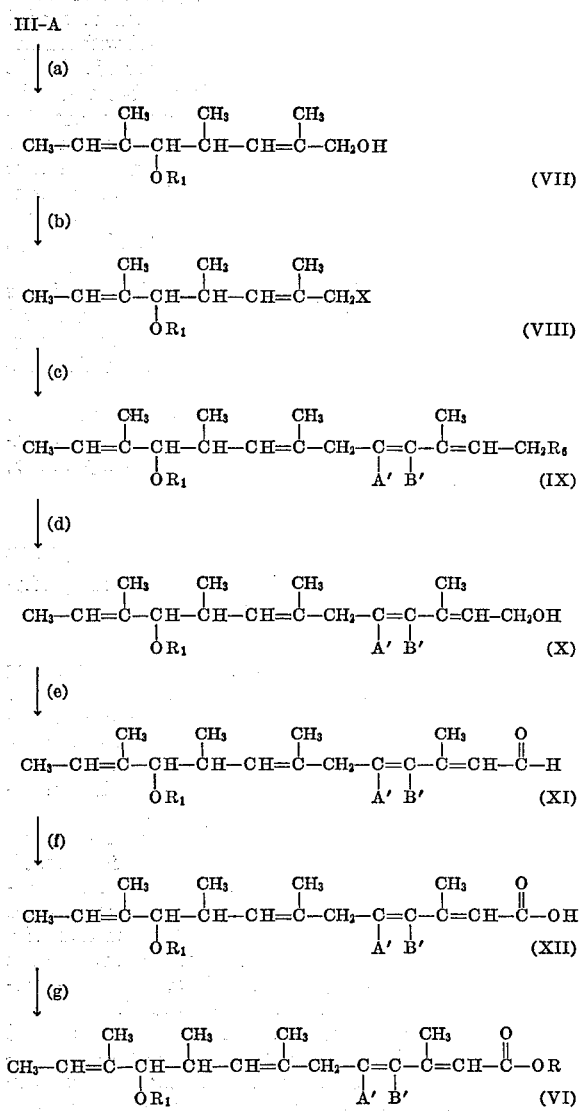

wherein $R_6$ is a hydrolyzable hydroxy portecting group; X is a halogen; A' and B' are as above; and R is as above.

The compound of Formula III-A is converted into a compound of Formula VII by treating the compound of Formula III-A with an alkali metal aluminum hydride or an aluminate reducing agent. Any of the conventional alkali metal aluminum hydride or aluminate reducing agents can be utilized. Among the preferred alkali metal aluminum hydride reducing agents are included, lithium aluminum hydride, sodium aluminum hydride, etc. Among the preferred aluminate reducing agents are included sodium dihydro-bis-(2-methoxyethoxy)-aluminate. This reduction preferably is carried out under anhydrous conditions in the presence of an inert organic solvent. Any conventional inert organic solvent can be utilized to carry out this reaction. Among the preferred inert organic solvents are included benzene, toluene, tetrahyrofuran, etc. In carrying out this reaction, temperature and pressure are not critical and the reaction can be suitably carried out at room temperature or elevated or reduced temperatures. However, temperatures of from about —20° C. to about 60° C. are generally preferred in carrying out this reaction.

The compound of Formula VII is converted to the compound of Formula VIII above, via reaction step (b), by subjecting the compound of Formula VII to halogenation in the presence of a base. Any conventional method of halogenation can be utilized in carrying out the reaction step (b). Generally, the halogenation can be carried out by treating the compound of Formula VII with a halogenating agent such as phosphorus tribromide in the presence of a base. Among the preferred bases are the tertiary amines such as pyridine. In carrying out this reaction, any conventional halogenating agent and base can be utilized. This reaction is carried out in the presence of a conventional inert organic solvent. Any conventional inert organic solvent can be generally utilized. Among the conventional inert organic solvents are included diethyl ether, tetrahydrofuran, etc. In carrying out this reaction, temperature and pressure are not critical and this reaction can be carried out at room temperature and atmospheric pressure. If desired, temperatures of from −50° C. to the reflux temperature of the reaction medium can be utilized.

The compound of Formula VIII is converted to the compound of Formula IX, via reaction step (c), by reacting the compound of Formula VIII with a compound of the formula:

(XXIV)

wherein $R_6$ is as above; and M is an alklali metal, preferably lithium or alkaline earth metal halide or a copper alkali metal complex thereof.

The compound of Formula IX is prepared by reacting the compound of Formula VIII with the compound of Formula XXIV or a copper alkali metal complex thereof. If the compound of Formula IX is produced from the compound of Formula XXIV, the compound of Formula XXIV and the compound of Formula VIII are reacted in the presence of cuprous chloride.

The copper alkali metal complex is formed by reacting the compound of Formula XXIV where M is an alkali metal with a cuprous halide. This reaction is carried out in an inert organic solvent. Any conventional inert organic solvent can be utilized in this reaction with the ether solvents such as diethyl ether, tetrahydrofuran being preferred. In carrying out this reaction temperatures of from 0° C. to 100° C. can be utilized.

In carrying out the reaction with either the compound of Formula XXIV or a copper alkali metal complex thereof, an inert organic solvent can be utilized as the reaction medium. Any conventional inert organic solvent can be utilized for this purpose. Among the conventional inert organic solvents are included the ether solvents such as diethyl ether, tetrahydrofuran, etc. In carrying out this reaction, temperature and pressure are not critical and this reaction can be carried out at room temperature and atmospheric pressure. On the other hand, higher or lower temperatures can be utilized. Generally, temperatures of from −80° C. to 100° C. can be utilized in carrying out this reaction. The reaction of the compound of Formula VIII with the acetylide of Formula XXIV produces the compound of Formula IX having the same configuration at the 2-position as the configuration of the double bond in the acetylide of Formula XXIV. If the double bond in the acetylide has a trans configuration, the double bond at the 2-position in the compound of Formula IX will also have a trans configuration and the configuration will remain the same throughout its conversion into compounds of the Formulae X, XI, XII and VI. If the double bond in the acetylide has a cis configuration, the double bond at the 2-position of the compound of Formula IX will also have a cis configuration. This 2-cis configuration will remain the same throughout its conversion into compounds of the Formulae X, XI, XII and VI. On the other hand, if the acetylide is a mixture of isomers having a cis and trans configuration about the double bond, the compound of Formula IX will also be a mixture of isomers having a 2-cis and 2-trans configuration. If this mixture is converted to the compound of Formula VI, the intermediates of Formulae X, XI and XII will all be mixtures of the 2-cis and trans isomers.

In the compound of Formula IX and in the alkali metal acetylide of Formula XXIV, $R_6$ can be a hydrolyzable ether group. These etherified hydroxy groups on conventional ether hydrolysis produce the hydroxy moiety. Suitable ether protecting groups are, tetrahydropyranyl ether, aryl methyl ethers, such as benzyl, benzhydryl, and trityl ethers or α-lower alkoxy lower alkyl ethers or methoxy methyl ethers or allylic ethers such as allyl ether.

If desired, the compound of Formula IX can be catalytically hydrogenated to produce the compound of Formula IX where A′ and B′ are hydrogen. This hydrogenation is carried out in an inert organic solvent such as ethyl acetate, toluene or petroleum ether in the presence of a selective hydrogenation catalyst, e.g., a palladium lead catalyst in the presence of quinoline [disclosed in Helvetica Chimica Acta 35, 446 (1952)]. The use of a selective hydrogenation catalyst converts the triple bond in the compound of Formula IX to a double bond at the 4-position which has a cis configuration.

The conversion of a compound of the Formula IX to a compound of the Formula X can take place by conventional ether hydrolysis.

The compound of Formula X is converted to the aldehyde of Formula XI by means of oxidation as in step (e). Any oxidizing agent which will oxidize a hydroxy group to an aldehyde group can be utilized in carrying out this step. Among the preferred oxidizing agents are included manganese dioxide. The compound of Formula XI can be oxidized to the compound of Formula XII via step (f) by treating the compound of Formula XI with an oxidizing agent. Any conventional oxidizing agent which can be utilized to oxidize aldehydes to the corresponding carboxylic acids can be utilized in carrying out this reaction. Among the preferred oxidizing agents for use in this reaction is silver oxide or silver nitrate. Generally, this reaction can be carried out in the presence of an inert organic solvent. Any conventional inert organic solvent can be utilized in carrying out this reaction. Typical inert organic solvents which can be utilized include benzene, hexane, ethanol, etc. The use of the inert solvents will depend to a large extent on the oxidizing agent used. The oxidation reaction, can, if desired, be carried out in the presence of an inorganic acid or alkali depending upon the choice of the oxidizing agent. In carrying out this oxidation reaction, temperature and pressure are not critical and this reaction can be carried out at room temperature and atmospheric pressure. Generally, it is preferred to utilize a temperature of from 0° C. to about 50° C.

On the other hand, the compound of Formula X can be directly oxidized to a compound of the Formula XII. In carrying out this reaction, any oxidizing agent which will directly oxidize alcohols to the corresponding carboxylic acid can be utilized. Among the preferred oxidizing agents are silver nitrate or silver oxide. Generally, this reaction is carried out in the solvent medium. Any conventional inert organic or inorganic solvent such as water, acetone, hexane, etc., can be utilized. The oxidation reaction can be carried out at room temperature if desired. However, higher or lower temperatures can be utilized. Generally, it is preferred to utilize a temperature of from 10° C. to 80° C.

The compound of Formula XII can be converted to the compound of Formula VI by esterification. Any conventional means of esterification can be utilized to carry out this reaction. Typical esterifying agents which can be utilized include diazo lower alkanes, such as diazo methane, diazo ethane; lower alkanols such as methanol, ethanol, isopropanol or lower alkyl halides such as methyl iodide, etc. Generally, this reaction takes place either in the presence of an acid or base. Any conventional inorganic acid or base can be utilized in conjunction with the aforementioned esterifying agent. Among the inorganic bases which can be utilized in accordance with this invention are sodium hydroxide, potassium carbonate, pyridine, sodium methoxide, etc. The choice of a particular base or acid depends on the particular esterifying agent used. In cases where lower alkanols are the esterifying agents, the reaction is generally carried out in the presence of an acid such as sulfuric or hydrochloric acid. Generally it is preferred to carry out this esterification reaction in the presence of an inert organic solvent. Any conventional inert organic solvent can be utilized in carrying out this reaction. Among the preferred inert organic solvents which can be utilized are included diethyl ether, petroleum ether, methyl ether, etc. In carrying out this reaction, temperature and pressure are not critical. Therefore, this reaction can be carried out at room temperature and atmospheric pressure or at elevated temperatures and pressures. Generally, it is preferred to carry out this reaction at a temperature of from 0° C. to the boiling point of the solvent.

Where A and B in the compound of Formula I form a double bond having a trans configuration, this compound can be prepared from the compound of Formula VIII by the following reaction scheme:

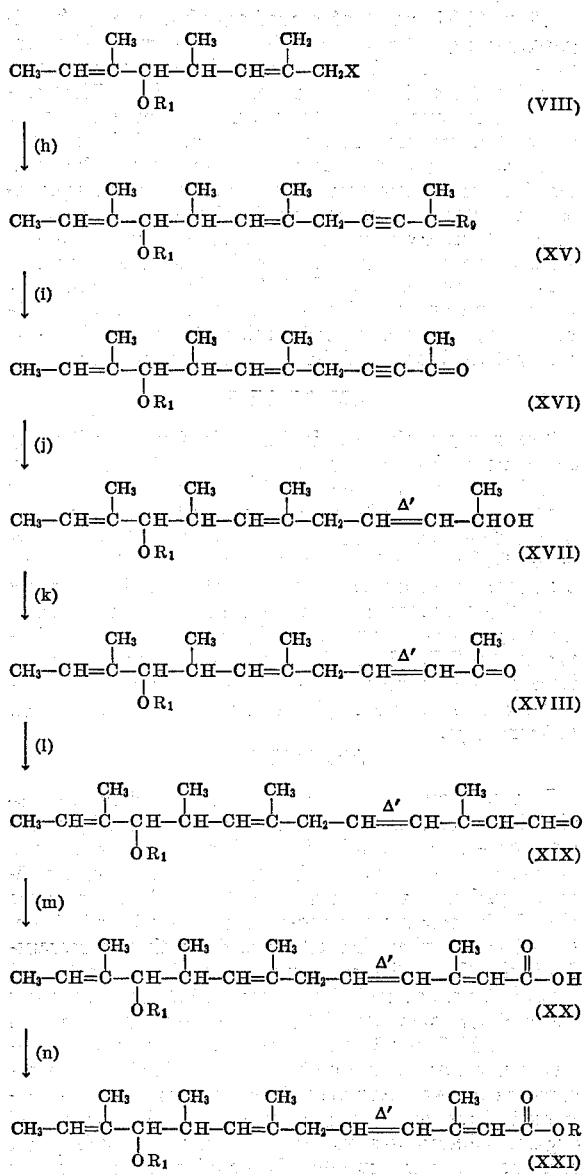

wherein R and R₁ are as above; and R₉ is a hydrolyzable ketal, and Δ' indicates that the double bond has a trans-configuration.

In converting the compound of Formula VIII above to the compound of Formula XV above, the compound of Formula VIII is reacted with an acetylide of the formula:

wherein M and R₉ are as above.

or copper alkali metal complex thereof.

In the compound of Formula XXV, R₉ can be any conventional hydrolyzable ketal group. These hydrolyzable ketal groups can be hydrolyzed to regenerate the ketone. Among the preferred hydrolyzable ketone protecting groups are included lower alkylene dioxy which are formed by reacting the oxo group of the ketone with a lower alkanediol. M, in the compound of Formula XXV, can be any alkali metal, preferably lithium, or alkaline earth metal halide.

In preparing the compound of Formula XV above, the compound of Formula VIII can be in its threo or erythro form or can be a mixture thereof. Separation of the mixtures can, if desired, be carried out at any stage of the process for converting the compound of Formula VIII to the compound of Formula XXI. Any conventional means of separation can be utilized such as those hereinbefore mentioned. The preferred means of separating these isomers is by chromatography of silica gel. Also, the threo or erythro isomers can be either in their optically active d or l form or be a racemic mixture thereof. If the threo or erythro isomers are racemic mixture, this racemic mixture can be separated by conventional methods such as mentioned hereinbefore. Also separation of the racemic mixtures can, if desired, be carried out at any stage of the process for converting the compound of Formula VII to the compound of Formula XXI.

The reaction of the compounds of the Formula VIII with the compounds of the Formula XXV is carried out under the same reaction conditions described hereinbefore in connection with the reaction of the acetylide of Formula XXIV with the compound of Formula VIII to produce the compound of Formula IX. The compound of Formula XV is converted to the compound of the Formula XVI by conventional acid hydrolysis. Any conventional means for hydrolyzing a ketal group to the corresponding ketone can be utilized in carrying out this reaction. The compound of Formula XVI is converted to the compound of Formula XVII via reaction step (j), by treating the compound of the Formula XVI with an alkali metal complex hydride reducing agent, preferably lithium aluminum hydride. In carrying out this reaction, any of the conditions conventional for reducing with an alkali metal aluminum hydride can be utilized. Generally, it is preferred to carry out this reaction in the presence of an organic solvent. The preferred inert organic solvents are the ether solvents such as tetrahydrofuran. In carrying out this reaction, temperatures from −10° C. to the reflux temperature of the reaction medium can be utilized. Reduction of the compound of Formula XVI with an alkali metal aluminum hydride produces a trans double bond at the 2-position of the compound of Formula XVII.

The compound of Formula XVII is converted to the compound of the Formula XVIII, via reaction step (k), by treating the compound of Formula XVII with an oxidizing agent. Any conventional oxidizing agent which will oxidize an alcohol to a ketone can be utilized in carrying out this reaction. The preferred oxidizing agent for use in this reaction is manganese dioxide. The reaction step (k) can take place utilizing the same conditions described in connection with the conversion of a compound of Formula X to a compound of the Formula XI via reaction step (e).

The conversion of the compound of the Formula XVIII to a compound of the Formula XIX can take place, via reaction step (l), by reacting the compound of the Formula XVIII with a compound of the formula:

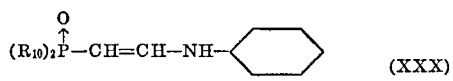

wherein $R_{10}$ is aryl, aryloxy or lower alkoxy.

The reaction between the compound of Formula XVIII and the compound of the Formula XXX is carried out in the presence of an alkali metal base in an inert solvent medium. Any conventional alkali metal base can be utilized. Among the conventional alkali metal bases are included alkali metal hydrides such as sodium hydride, potassium hydride; and the alkali metal amide bases such as sodamide, potassium amide, sodium methylamide, potassium methylamide as well as other alkali metal alkyl amides. In carrying out this reaction, any conventional inert organic solvent can be utilized such as benzene, toluene, N,N-dimethylformamide, tetrahydrofuran, dioxane and 1,2-dimethoxyethane. In carrying out this reaction, temperatures of from 0° C. to 35° C. should be utilized.

The aldehyde of Formula XIX is converted to the acid of Formula XX via reaction step (m) in the same manner as described in connection with the oxidation of a compound of the Formula XI to a compound of the Formula XII, via reaction step (f). The compound of Formula XX is then esterified by the procedure given in reaction step (g) for the esterification of the compound of the Formula XII to the compound of the Formula VI. The esterification of the compound of the Formula XX produces the compound of the Formula XXI.

In accordance with another embodiment of this invention, the compound of Formula XVIII can be directly converted to the compound of the Formula XXI by reacting the compound of the Formula XVIII with a compound of the formula:

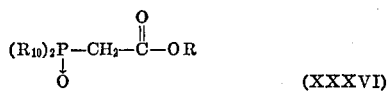

wherein R and $R_{10}$ are as above.

This reaction is carried out by utilizing the same procedure that was utilized to react a compound of the Formula XVIII with a compound of the Formula XXX as in step (l). Generally it is preferred to carry out the reaction in the presence of a base such as an alkali metal lower alkoxide.

The following examples are illustrative but not limitative of this invention. The ether utilized in these examples was diethyl ether. The temperature in all of the following examples is in degrees centigrade.

EXAMPLE 1

Cis- and trans-methyl propenyl ether

A 2.5-cm. diameter glass column, 51 cm. overall length of which 35 cm. was packed with 4–8 mesh pumice stone, was encased in a Lindberg Hevi Duty pyrolysis oven. A dropping funnel was attached at the top of the column and the bottom of the column was attached to a receiver cooled in Dry Ice acetone. The glass column was heated to 325° C. Propionaldehyde dimethyl acetal (117.0 g.) was added dropwise under nitrogen at the top of the column; a mixture of starting acetal, methyl propenyl ether and methanol was collected in the receiver. This mixture was washed with a 5% by weight aqueous sodium carbonate solution, dried with anhydrous potassium carbonate and finally distilled at 40–50° C. to give a 1:1 part by weight mixture of cis- and trans-methyl propenyl ether.

EXAMPLE 2

Tiglic aldehyde dimethyl acetal (52.0 g.), and 10 ml. of a 10% by weight solution of zinc chloride in ethyl acetate were placed in a 250 ml. flask equipped with a magnetic stirrer and dropping funnel. The reaction was conducted in an atmosphere of nitrogen. The mixture was heated to 40–45° C., and 31.7 g. of methyl propenyl ether was added over a 30-minute period. After the addition was complete, the reaction mixture was stirred at 40–45° C. overnight. The mixture was diluted with diethyl ether, washed successively with dilute aqueous sodium hydroxide and saturated aqueous sodium chloride solution, and finally dried with sodium sulfate. Evaporation of the solvent and distillation of the residue afforded 2,4-dimethyl-3-methoxy-4-hexenal dimethyl acetal, B.P. 80–95° C. (10 mm. Hg).

EXAMPLE 3

The acetal was hydrolyzed with a 2:1 parts by volume solution of 5% by weight aqueous sulfuric acid solution in tetrahydrofuran at room temperature to give after extraction 2,4-dimethyl-3-methoxy-4-hexenal.

EXAMPLE 4

18 g. (0.05 mole) of carbethoxyethylidene triphenylphosphorane, 7.8 g. (0.05 mole) of 2,4-dimethyl-3-methoxy-4-hexenal and 125 ml. of dry benzene were heated to reflux for 48 hours in an inert atmosphere. The reaction mixture was allowed to cool and was poured into ice water. The organic phase was separated and the aqueous phase was extracted twice with diethyl ether. The combined organic phase was washed with saturated aqueous sodium chloride solution and dried with anhydrous sodium sulfate. Evaporation of the solvent gave a yellow solid which was triturated three times with pentane. Removal of the pentane afforded a mixture consisting of d,l-erythro-trans,trans-2,4,6 - trimethyl-5-methoxyocta-2,6-dienoic acid ethyl ester and d,l-threo-trans,trans-2,4,6-trimethyl-5-methoxyocta-2,6-dienoic acid ethyl ester.

EXAMPLE 5

The mixture obtained in Example 4 was purified by chromatography on silica gel (ratio 30:1) and elution with hexane diethyl ether, gradually increasing the ether content from 1 to 5% by volume. The less polar erythro isomer d,l - erythro-trans,trans-2,4,6-trimethyl-5-methoxyocta-2,6-dienoic acid ethyl ester was obtained followed by a mixture of the diastereoisomers and finally by the more polar threo isomer d,l-threo-trans,trans-2,4,6-trimethyl-5-methoxyocta-2,6-dienoic acid ethyl ester. The erythro isomer had a B.P. 60–65° C. (0.1 mm. Hg) and the threo isomer d,l-threo-trans,trans - 2,4,6 - trimethyl-5-methoxyocta-2,6-dienoic acid ethyl ester had a B.P. 130–140° C. (10 mm. Hg).

EXAMPLE 6

In a 500 ml. flask equipped with a condenser, dropping funnel and magnetic stirrer, and protected by an inert atmosphere, 200 ml. of anhydrous diethyl ether and 24 ml. of a 70% by weight solution of sodium bis-(2-methoxyethoxy)-aluminum hydride in benzene were placed. The mixture was cooled in an ice-bath and 11.5 g. (0.048 mole) of erythro ester i.e., d,l-erythro-trans,trans-2,4,6-trimethyl - 5 - methoxyocta-2,6-dienoic acid ethyl ester, in 10 ml. of diethyl ether was added dropwise. After the addition was complete, the reaction mixture was stirred at 0° C. for 3 hours. Then a 20% by weight aqueous solution of sodium hydroxide was added and the organic phase was separated. The aqueous layer was extracted three times with diethyl ether. The combined organic solution was washed with water and dried with anhydrous sodium sulfate. Evaporation of the solvent afforded the crude erythro isomer d,l-erythro-trans,trans-2,4,6 - trimethyl-5-methoxyocta-2,6-dien-1-ol, which was used without further purification for preparation of the corresponding bromide. A pure sample was distilled at 140–150° C. (oil bath temperature) and 10 mm. Hg.

EXAMPLE 7

By the procedure of Example 6, 8.0 g. (0.033 mole) of the threo ester i.e., d,l-threo-trans,trans-2,4,6-trimethyl-5-methoxyocta-2,6-dienoic acid ethyl ester, was converted to 6.5 g. of crude d,l-threo-trans,trans-2,4,6-trimethyl-5-methoxyocta-2,6-dien-1-ol. A pure sample was distilled at 140–150° C. (oil bath temperature) and 10 mm. Hg.

EXAMPLE 8

The erythro alcohol, d,l-erythro-trans,trans-2,4,6-trimethyl-5-methoxyocta-2,6-dien-1-ol (4.0 g., 0.02 mole) in 24 ml. of anhydrous diethyl ether was placed in a 100 ml. flask equipped with a condenser, stirrer and nitrogen inlet. The mixture was cooled to −20° C. in a Dry Ice acetone bath and 0.3 ml. of anhydrous pyridine was added. A solution of 2.0 g. (7.4 mmoles) of freshly distilled phosphorus tribromide in 8 ml. of anhydrous diethyl ether was added dropwise with stirring over a 30-minute period. After the addition was complete, the reaction mixture was stirred without cooling for 2 hours. The mixture was poured into ice water and the diethyl ether phase was separated. The aqueous phase was extracted three times with diethyl ether and the combined ether extracts were washed three times with saturated aqueous sodium bicarbonate solution and then with water and dried with anhydrous sodium sulfate. Evaporation of the solvent afforded crude erythro bromide, d,l-erythro-trans,trans-1-bromo-2,4,6-trimethyl-5-methoxyocta-2,6 - diene. A pure sample was distilled at 60–70° C. (oil bath temperature) and 0.1 mm. Hg.

EXAMPLE 9

The threo alcohol, d,l-trans,trans - 2,4,6 - trimethyl-5-methoxyocta-2,6-dien-1-ol, (4.0 g., 0.02 mole) was converted as described in Example 8 to the crude threo bromide d,l - threo - trans,trans-1-bromo-2,4,6-trimethyl-5-methoxyocta-2,6-diene. After distillation at 60–70° C. (oil bath temperature) and 0.1 mm. Hg, a pure sample was obtained.

EXAMPLE 10

In a 100 ml. flask equipped with a magnetic stirrer, condenser and thermometer, and protected by an argon atmosphere, a solution of 4.36 g. (24.0 mmole) of trans-3-methyl-2-penten-4-yn-1-ol tetrahydropyranyl ether in 20 ml. of dry tetrahydrofuran (freshly distilled from lithium aluminum hydride) was placed. The mixture was cooled to 0° C. in an ice bath and methyl lithium (14.0 ml. of a 1.75 M solution in diethyl ether, 24.5 mmoles) was added. The reaction mixture was allowed to come to room temperature, stirred for 30 minutes, then was cooled to 0° C. Copper (I) chloride (50 mg.) was added, followed by addition of a solution of the erythro bromide, d,l-erythro-trans,trans - 1 - bromo - 2,4,6 - trimethyl-5-methoxyocta-2,6-diene, (4.0 g., 15.4 mmoles) in 16 ml. of dry tetrahydrofuran. The mixture was heated to the reflux for 2 hours and then allowed to stir at room temperature overnight. The reaction mixture was worked up by pouring onto water and ice and extracting the aqueous phase with diethyl ether. The combined organic phase was washed with aqueous saturated sodium chloride and dried with any hydrous sodium sulfate. Evaporation of the solvent afforded 6.7 g. of crude erythro isomer, d,l-erythro-trans,trans,trans - 2 - (3,7,9,11 - tetramethyl - 10 - methoxy-2,7,11 - tridecatrien - 4 - ynyl - oxy) tetrahydropyran, which was purified by chromatography on silica gel (250 g.) and elution with hexane containing increasing amounts of ether. This erythro isomer was eluted with 95:5 parts by volume hexane: diethyl ether. This isomer was obtained in pure form by distillation at 160–170° C. (oil bath temperature) and 0.1 mm. Hg.

EXAMPLE 11

The threo bromide, i.e., d,l-threo-trans,trans-1-bromo-2,4,6-trimethyl-5-methoxyocta - 2,6 - diene (4.0 g., 15.4 mmoles) was converted by the procedure of Example 10 to give the threo isomer i.e., d,l-threo-trans,trans,trans-2-(3,7,9,11-tetramethyl - 10 - methoxy - 2,7,11 - tridecatrien - 4 - ynyl - oxy)-tetrahydropyran. This isomer distilled at 160–170° C. (oil bath temperature) and 0.1 mm. Hg.

EXAMPLE 12

The erythro tetrahydropyranyl ether, i.e., d,l-erythro-trans,trans,trans - 2 - (3,7,9,11-tetramethyl-10-methoxy-2,7,11-tridecatrien - 4 - ynyl - oxy)-tetrahyropyran (6.0 g. 16.6 mmoles) in 95 ml. of ethanol was stirred at 45–50° C. with 0.5 ml. of 1 N hydrochloric acid solution for 5 hours and then at room temperature overnight. The mixture was neutralized with solid sodium carbonate, filtered and the filtrate was concentrated. The residue was dissolved in diethyl ether, washed with saturated sodium chloride solution and dried with anhydrous sodium sulfate. Evaporation of the solvent afforded d,l-erythro-trans,trans,trans - 3,7,9,11 - tetramethyl-10-methoxy-2,7,11-tridecatrien-4-yn-1-ol. This alcohol was dissolved in 50 ml. of methylene chloride and added to a cooled (0° C.) suspension of 31.0 g. of activated manganese dioxide in 350 ml. of methylene chloride. The oxidation was carried out in a nitrogen atmosphere. The mixture was stirred for one hour at 0° C. and for 1 hour at room temperature, then filtered and the filtrate was concentrated to give d,l-erythro-trans,trans,trans - 3,7,9,11 - tetramethyl - 10-methoxy - 2,7,11 - tridecatrien - 4 - yn-1-al. This aldehyde in 60 ml. of ethanol was combined with a solution of 7.5 g. of silver nitrate in 15 ml. of water in a 250 ml. flask and the mixture was cooled to 0° C. A solution of 7.5 g. of sodium hydroxide in 80 ml. of water was added dropwise with stirring. The reaction mixture was stirred at 0° C. for one hour, then for an additional hour at room temperature, and filtered. The filtrate was concentrated, the residue was dissolved in water and extracted with diethyl ether. The aqueous phase was made acidic (pH 1) with 6 N aqueous hydrochloric acid and extracted three times with diethyl ether. These latter ether extracts were washed with a saturated aqueous sodium chloride solution and dried with sodium sulfate. Evaporation of the solvent afforded d,l - erythro - trans,trans,trans - 3,7,9,11-tetramethyl - 10 - methoxytrideca - 2,7,11 - trien-4-ynoic acid. This acid which was dissolved in 60 ml. of anhydrous ether was treated with a 1% solution of diazomethane in ether. The reaction mixture was stirred for one hour, then 5 ml. of dilute acetic acid was added and the aqueous phase was extracted with diethyl ether. The combined organic phase was washed successively with saturated sodium bicarbonate solution and water and dried with sodium fate. Evaporation of the solvent afforded d,l-erythro-trans,trans,trans-3,7,9,11 - tetramethyl - 10 - methoxytrideca-2,7,11-trien-4-ynoic acid methyl ester, which was purified by chromatography on 120 g. of silica gel. Elution with hexane containing 2–3% by volume of diethyl ether afforded d,l - erythro - trans,trans,trans - 3,7,9,11-tetramethyl-10-methoxytrideca - 2,7,11 - trien-4-ynoic acid methyl ester, which had a B.P. 130–140° C. (0.1 mm. Hg.) (oil bath temperature).

EXAMPLE 13

The threo ether, d,l-threo-trans,trans,trans-2-(3,7,9,11-tetramethyl - 10 - methoxy - 2,7,11 - tridecatrien-4-ynyl-oxy)-tetrahydropyran (5.65 g., 15.7 mmoles) was converted by the procedure of Example 12 to the threo ester, d,l - threo - trans,trans,trans - 3,7,9,11 - tetramethyl-10-methoxytrideca - 2,7,11 - trien - 4 - ynoic acid methyl ester obtained by elution of the silica gel column with hexane containing 3–4% by volume ether. The product had a B.P.

120–130° C. (0.05 mm.) (oil bath temperature). In this process, the following compounds were formed as intermediates:

d,l-threo-trans,trans,trans-3,7,9,11-tetramethyl-10-methoxy-2,7,11-tridecatrien-4-yn-1-ol;
d,l-threo-trans,trans,trans-3,7,9,11-tetramethyl-10-methoxy-2,7,11-tridecatrien-4-yn-1-al; and
d,l-threo-trans,trans,trans-3,7,9,11-tetramethyl-10-methoxytrideca-2,7,11-trien-4-ynoic acid.

EXAMPLE 14

The erythro tetrahydropyranyl ether, i.e., d,l-erythro-trans,trans,trans-2-(3,7,9,11 - tetramethyl - 10 - methoxy-2,7,11 - tridecatrien - 4 - ynyl-oxy)-tetrahydropyran, 2.88 g., 8 mmoles) in 172 ml. of heptane containing 0.8 g. of Lindlar's catalyst and 2 ml. of quinoline was stirred with hydrogen at atmospheric pressure until 115% of the theoretical amount of hydrogen had been absorbed. After filtration, the solution was concentrated and purified by chromatography on 700 g. of neutral alumina (activity II). Elution with hexane-benzene (3:1 parts by volume) afforded d,l - erythro - trans,cis,trans,trans - 2 - (3,7,9,11-tetramethyl - 10 - methoxy - trideca - 2,4,7,11-tetraenyl-oxy) - tetrahydropyran.

EXAMPLE 15

By the procedure of Example 12, d,l-erythro-trans,cis,trans,trans - 2 - (3,7,9,11-tetramethyl-10-methoxy-2,4,7,11-tridecatetraenyloxy)-tetrahydropyran was first hydrolyzed to d,l-erythro-trans,cis,trans,trans-3,7,9,11-tetramethyl-10-methoxy-2,4,7,11-tridecatetraen-2-ol which was then oxidized with manganese dioxide to d,l-erythro-trans,cis,trans,trans - 3,7,9,11 - tetramethyl-10-methoxy-trideca-2,4,7,11-tetraen-1-al. This aldehyde was then oxidized with silver oxide to the acid, d,l-erythro-trans,cis,trans,trans-3,7,9,11-tetramethyl - 10 - methoxy-trideca-2,4,7,11-tetraenoic acid. This acid, upon recrystallization from pentane was in the form of a colorless crystal (M.P. 65–67° C.).

EXAMPLE 16

The erythro acid, d,l-erythro-trans,cis,trans,trans-3,7,9,11 - tetramethyl - 10 - methoxy-trideca-2,4,7,11-tetraenoic acid, (550 mg., 1.88 mmoles) in diethyl ether solution was esterified by the procedure given in Example 12 utilizing a 1% by weight solution of diazomethane in diethyl ether. The reaction product was distilled at 110–120° C. (oil bath temperature) and 0.05 mm. Hg to give d,l-erythro-trans,cis,trans,trans - 3,7,9,11-tetramethyl-10-methoxy-trideca-2,4,7,11-tetraenoic acid methyl ester.

EXAMPLE 17

The compound d,l-threo-trans,trans,trans-2-(3,7,9,11-tetramethyl - 10-methoxy-2,7,11-tridecatrien-4-ynyl-oxy)-tetrahydropyran (4.53 g., 12.6 mmoles) dissolved in heptane was hydrogenated by the procedure given in Example 14 utilizing 1.26 grams of Lindlar catalyst and 3.65 ml. of quinoline to produce d,l-threo-trans,cis,trans,trans-2-(3,7,9,11 - tetramethyl - 10-methoxy-2,-4,7,11-tridecatetraenyl-oxy)-tetrahydropyran. This compound was obtained after chromatographic purification and subjected to hydrolysis by the procedure given in Example 12 to produce the alcohol, d,l-threo-trans,cis,trans,trans-3,7,9,11-tetramethyl-10-methoxy-trideca-2,4,7,11-tetraen-1-ol. The alcohol was oxidized with manganese dioxide by the procedure given in Example 12 to produce the aldehyde, d,l-threo-trans,cis,trans,trans - 3,7,9,11-tetramethyl-10-methoxytrideca-2,4,7,11-tetraen-1-al. This aldehyde was oxidized with silver oxide by the procedure given in Example 12 to produce d,l - threo - trans,cis,trans,trans - 3,7,9,11 - tetramethyl-10-methoxytrideca-2,4,7,11-tetraenoic acid which was directly converted without isolation by the procedure of Example 12 to the ester, d,l-threo-trans,cis,trans,trans-3,7,9,11-tetramethyl - 10 - methoxytrideca - 2,4,7,11-tetraenoic acid methyl ester. This ester was chromatographed on silica gel and eluted with hexane containing 3% by volume of diethyl ether. Distillation at 110° C. to 120° C. (oil bath temperature) and 0.05 mm. Hg afforded pure ester.

EXAMPLE 18

2-ethynyl-2-methyl-1,3-dioxlane 3-butyn-2-one (13.6 g., 0.2 mole), 37.4 g. (0.6 mole) of ethylene glycol, 90 mg. of p-toluene sulfonic acid and 45 mg. of hydroquinone in 90 ml. of pentane were heated to reflux overnight. The organic layer was separated and the aqueous phase was extracted with diethyl ether. The combined organic phase was washed with saturated aqueous sodium chloride and dried with sodium sulfate. The solvent was removed by distillation and the residue was distilled at 80–82° C. (140 mm. Hg) to give 2-ethynyl-2-methyl-1,3-dioxolane.

EXAMPLE 19

To a solution 12.3 g. (0.11 mole) of 2-ethynyl-2-methyl-1,3-dioxolane in 100 ml. of dry tetrahydrofuran in a 500 ml., three-necked flask, fitted with a magnetic stirrer, condenser and protected by a nitrogen atmosphere and cooled in an ice-bath, 42 ml. (0.10 mole) of a 2.4 molar solution of methyl lithium in diethyl ether was added dropwise. After the addition was complete, the mixture was stirred at 0° C. for another hour. Cuprous chloride (280 mg.) was added in one portion followed by dropwise addition at 0° C. of a solution of 17.3 g. (0.066 mole) of erythro bromide d,l-erythro-trans,trans-1-bromo-2,4,6-trimethyl-5-methoxyocta-2,6-diene in 100 ml. of dry tetrahydrofuran. After the addition was complete, the reaction mixture was stirred at 0° C. for one hour, then heated to reflux for 3 hours and then stirred at room temperature overnight. The mixture was poured into ice water and extracted with diethyl ether. The combined organic extract was washed with saturated aqueous sodium chloride solution and dried with sodium sulfate. Evaporation of the solvent afforded d,l-erythro-trans,trans-2-methyl-2-[4,6,8-trimethyl - 7-methoxy-deca-4,8-dien-1-ynyl]-1,3-dioxolane, which was purified by chromatography on 500 g. of silica gel. Elution with hexane containing 1–6% by volume of diethyl ether afforded d,l-erythro-trans,trans-2-methyl-2-[4,6,8 - trimethyl-7-methoxy-deca-4,8,-dien-1-ynyl]-1,3-dioxolane.

EXAMPLE 20

By the procedure of Example 19, d,l-threo-trans,trans-1 - bromo - 2,4,6 - trimethyl-5-methoxyocta-2,6-diene was converted to d,l - threo-trans-trans-2-methyl-2-[4,6,8-trimethyl-7-methoxy-deca-4,8-dien-1-ynyl]-1,3-dioxolane.

EXAMPLE 21

A solution of the acetylenic ketal d,l-erythro-trans,trans - 2 - methyl-2-[4,6,8-trimethyl-7-methoxy-deca-4,8-dien-1-ynyl]-1,3-dioxolane (4.25 g., 14.6 mmoles) in 40 ml. of methanol was hydrolyzed with 2.0 ml. of 3 N aqueous sulfuric acid. The mixture was stirred for 4 hours at room temperature and then neutralized with solid sodium carbonate. The mixture was filtered and the filtrate was concentrated and then redissolved in 50 ml. of diethyl ether. The ether solution was washed with saturated aqueous sodium chloride solution, dried with sodium sulfate and the solvent was evaporated to give the ketone, d,l-erythro-trans,trans-6,8,10-trimethyl-9-methoxy-dodeca-6,10-dien-3-yn-2-one.

Without further purification, the ketone was dissolved in 20 ml. of dry tetrahydrofuran and was added dropwise to a suspension of 0.95 g. (2.5 mmoles) of lithium aluminum hydride in 150 ml. of tetrahydrofuran, which was cooled in an ice-bath and protected by a nitrogen atmosphere. After the addition was complete, the mixture was heated to reflux for 2 hours. After reaction of the excess hydride with ethyl acetate, saturated aqueous sodium sulfate solution was added. The mixture was filtered and the residue was washed with diethyl ether; the combined filtrate was dried with sodium sulfate. Evaporation of the solvent afforded the alcohol d,l-erythro-trans,trans,trans-6,8,10 - trimethyl-9-methoxy-dodeca-3,6,10-trien-2-ol. A sample was distilled at 100–110° C. (oil bath temperature) and 0.025 mm. Hg.

EXAMPLE 22

The threo ketal, d,l-threo-trans,trans-2-methyl-2-[4,6,8-trimethyl-7-methoxy-deca-4,8-dien-1-ynyl]-1,3 - dioxolane was hydrolyzed in Example 21 above to give the threo acetyletic ketone, d,l-threo-trans,trans-6,8,10-trimethyl-9-methoxy dodeca-6,10-dien-3-yn-2-one. By the procedure of Example 21, the threo acetylenic ketone was reduced with lithium aluminum hydride to d,l-threo-trans,trans, trans - 6,8,10 - trimethyl - 9 - methoxy - dodeca - 3,6,10-trien-2-ol.

EXAMPLE 23

The alcohol d,l - erythro - trans,trans,trans-6,8,10-trimethyl-9-methoxy-dodeca - 3,6,10 - trien-2-ol (3.2 g., 12 mmoles) and 28.0 g. (0.32 mole) of activated manganese dioxide in 275 ml. of methylene chloride was stirred for 12 hours at room temperature in a nitrogen atmosphere. After filtration, the filtrate was concentrated to give d,l-erythro-trans,trans,trans-6,8,10 - trimethyl - 9 - methoxy-dodeca-3,6,10-trien - 2 - one as product. The product was purified by chromatography on 75 g. silica gel and elution with hexane containing 1–5% by volume diethyl ether to give of pure erythro α,β-unsaturated ketone d,l-erythro-trans,trans,trans - 6,8,10 - trimethyl-9-methoxydodeca-3,6,10-trien-2-one. A sample, distilled at 100–110° C. (oil bath temperature) and 0.1 mm. Hg.

EXAMPLE 24

In a 50 ml. flask equipped with a stirrer and protected by an atmosphere of nitrogen, 230 mg. (1 mmole) of d,l-erythro-trans,trans,trans-6,8,10 - trimethyl - 9 - methoxy-dodeca-3,6,10-trien-2-one, and 265 mg. (1.45 mmoles) of trimethyl-phosphonoacetate were dissolved in 4 ml. of dry benzene and cooled to 15° C. in an ice bath. A solution of freshly prepared sodium methoxide, prepared by addition of 34.5 mg. (1.5 mmole) of sodium metal to 2 ml. of methanol, was then added slowly. After the addition was complete, the reaction mixture was stirred at room temperature for 3 hours, then poured into ice water and extracted with benzene. The benzene extract was washed with saturated sodium chloride solution, dried with sodium sulfate and evaporated. The crude product was purified by chromatography on 10 g. of silica gel. Elution with hexane containing 1–5% by volume of diethyl ether afforded d,l - erythro-all-trans,3,7,9,11-tetramethyl-10-methoxy-trideca-2,4,7,11-tetraenoic acid methyl ester.

EXAMPLE 25

In a 100 ml. three-necked flask fitted with a magnetic stirrer and protected by a nitrogen atmosphere, 345 mg. (8.5 mg. (8.5 mmoles) of sodium hydride (59.2% by weight mineral oil dispersion) was washed free of the mineral oil with pentane and the resulting oil-free hydride was suspended in 6 ml. of dry tetrahydrofuran and cooled to 0° C. in an ice-bath. A solution of 2.23 g. (8.5 mmoles) of diethyl-2-(cyclohexylamino) - vinylphosphonate in 15 ml. of tetrahydrofuran was added dropwise at 0° C. over a 15-minute period. The mixture was further stirred for 30 minutes at this temperature. The mixture was then cooled to —40° C. and a solution of 2.15 g. (8.65 mmoles) of d,l-erythro-trans,trans,trans-6,8,10-trimethyl-9-methoxydodeca-3,6,10-trien-2-one in 21 ml. of tetrahydrofuran was added dropwise. The reaction mixture was allowed to come slowly to 0° C. and maintained at this temperature for another hour. The mixture was poured into ice water, saturated with sodium chloride and extracted with diethyl ether. The organic extract was washed with saturated aqueous sodium chloride solution, dried with sodium sulfate and concentrated to give 4.1 g. of a residue, which was dissolved in 50 ml. of benzene.

The benzene solution was treated with 70 ml. of a 10% solution of oxalic acid and heated to the reflux for 2 hours under nitrogen. The organic layer was separated, washed with saturated sodium chloride solution, dried and evaporated to give d,l-erythro-all-trans-3,7,9,11-tetramethyl-1010-methoxy-trideca-2,4,7,11-tetraen-1-al.

EXAMPLE 26

By the procedure of Example 12, d,l-erythro-all-trans-3,7,9,11-tetramethyl - 10 - methoxy-trideca-2,4,7,11-tetraen-1-al was oxidized with silver oxide to form the acid, d,l - erythro-all-trans-3,7,9,11-tetramethyl-10-methoxy-trideca-2,4,7,11-tetraenoic acid. This acid was then reacted with diazomethane in the manner described in Example 12 to produce d,l - erythro-all-trans-3,7,9,11-tetramethyl-10-methoxy-trideca-2,4,7,11-tetraenoic acid methyl ester.

EXAMPLE 27

By the procedure of Example 24, d,l-threo-all-trans-6,8, 10-trimethyl-9-methoxy-dodeca-3,6,10-trien - 2 - one was reacted with trimethyl phosphonoacetate to produce d,l-threo-all-trans-3,7,9,11-tetramethyl - 10 - methoxy-trideca-2,4,7,11-tetraenoic acid methyl ester.

EXAMPLE 28

By the procedure of Example 25, d,l-threo-trans,trans, trans-6,8,10-trimethyl-9-methoxy-dodeca - 3,6,10 - trien-2-one was reacted with 2 - [cyclohexylamino]-vinylphosphonate to produce d,l - threo - all - trans-3,7,9,11-tetramethyl-10-methoxy-trideca-2,4,7,11-tetraen-1-al.

EXAMPLE 29

By the procedure of Example 12, d,l-threo-all-trans-3,7, 9,11-tetramethyl-10-methoxy-trideca - 2,4,7,11 - tetraen-1-al was oxidized with silver oxide to produce d,l-threo-all-trans-3,7,9,11-tetramethyl - 10 - methoxy-trideca-2,4,7,11-tetraenoic acid. This acid was then reacted by the procedure given in Example 12 with diazomethane to produce the ester, d,l-threo-all-trans-3,7,9,11-tetramethyl-10-methoxy-trideca-2,4,7,11-tetraenoic acid methyl ester. This ester was chromatographed on silica gel and eluted with hexane containing 1–5% by volume of diethyl ether to give the ester in pure form.

EXAMPLE 30

By the procedure of Example 23, d,l-threo-trans,trans, trans-6,18,10-trimethyl - 9 - methoxy-dodeca-3,6,10-trien-2-ol was similarly oxidized to the threo ketone, d,l-threo-trans,trans,trans-6,8,10-trimethyl - 9 - methoxy-dodeca-3, 6,10-trien-2-one.

EXAMPLE 31

18 g. (0.05 mole) of carbethoxyethylidene triphenylphosphorane, 7.8 g. (0.05 mole) of 2,4-dimethyl-3-methoxy-4-hexenal and 125 ml. of absolute ethanol were heated to reflux for 48 hours in an inert atmosphere. The reaction mixture was allowed to cool, diluted with ether and poured into ice water. The organic phase was separated and the aqueous phase was extracted twice with diethyl ether. The combined organic phase was washed with saturated aqueous sodium chloride solution and dried with anhydrous sodium sulfate. Evaporation of the solvent gave a yellow solid which was triturated three times with pentane. Removal of the pentane afforded a mixture consisting of d,l-erythro-cis,trans - 2,4,6 - trimethyl-5-methoxyocta-2,6-dienoic acid ethyl ester and d,l - threo-cis, trans-2,4,6-trimethyl-5-methoxyocta-2,6-dienoic acid ethyl ester.

EXAMPLE 32

By the procedure of Example 5, the mixture obtained in Example 31 is separated into the d,l-erythro-cis,trans-2,4,6-trimethyl-5-methoxyocta - 2,6 - dienoic acid ethyl ester and d,l-threo-cis,trans - 2,4,6 - trimethyl-5-methoxy-octa-2,6-dienoic acid ethyl ester.

EXAMPLE 33

By the procedure of Examples 6, 8, 10 and 12, the d,l-erythio-cis,trans - 2,4,6 - trimethyl-5-methoxy-2,6-dienoic acid ethyl ester was converted to d,l-erythro-trans,cis,trans - 3,7,9,11 - tetramethyl - 10 - methoxytrideca-2,7,11-trien-4-ynoic acid methyl ester via the following intermediates:

d,l-erythro-cis,trans-2,4,6-trimethyl-5-methoxyocta-2,6-dien-1-ol;
d,l-erythro-cis,trans-1-bromo-2,4,6-trimethyl-5-methoxyocta-2,6-diene;
d,l-erythro-trans,cis,trans-2-(3,7,9,11-tetramethyl-10-methoxy-2,7,11-tridecatrien-4-ynyl-oxy)-tetrahydropyran;
d,l-erythro-trans,cis,trans-3,7,9,11-tetramethyl-10-methoxy-2,7,11-tridecatrien-4-yn-1-ol;
d,l-erythro-trans,cis,trans-3,7,9,11-tetramethyl-10-methoxy-2,7,11-tridecatrien-4-yn-1-al; and
d,l-erythro-trans,cis,trans-3,7,9,11-tetramethyl-10-methoxy-2,7,11-tridecatrien-4-ynoic acid.

EXAMPLE 34

By the procedure of Examples 14, 15 and 16, d,l-erythro - trans,cis,trans - 2 - (3,7,9,11 - tetramethyl - 10-methoxy - 2,7,11 - tridecatrien - 4 - ynyl-oxy)-tetrahydropyran is converted to d,l-erythro-trans,cis, cis,trans-3,7,9,11 - tetramethyl - 10 - methoxy-trideca-2,4,7,11-tetraenoic acid methyl ester via the following intermediates:

d,l-erythro-trans,cis,cis, trans-2-(3,7,9,11-tetramethyl-10-methoxy-trideca-2,4,7,11-tetraenyl-oxy)-tetrahydropyran;
d,l-erythro-trans,cis,cis,trans-3,7,9,11-tetramethyl-10-methoxy-2,4,7,11-tridecatetraen-1-ol;
d,l-erythro-trans,cis,cis,trans-3,7,9,11-tetramethyl-10-methoxy-2,4,7,11-tridecatetraen-1-al; and
d,l-erythro-trans,cis,cis,trans-3,7,9,11-tetramethyl-10-methoxy-2,4,7,11-tridecatetraenoic acid.

EXAMPLE 35

By the procedure of Examples 6, 8, 10 and 12, the d,l-threo-cis,trans-2,4,6-trimethyl-5-methoxy-2,6-dienoic acid ethyl ester was converted to d,l-threo-trans,cis,trans-3,7,9,11-tetramethyl - 10 - methoxytrideca-2,7,11-trien-4-ynoic acid methyl ester via the following intermediates:

d,l-threo-cis,trans-2,4,6-trimethyl-5-methoxyocta-2,6-dien-1-ol;
d,l-threo-cis,trans-1-bromo-2,4,6-trimethyl-5-methoxy-octa-2,6-diene;
d,l-threo-trans,cis,trans-2-(3,7,9,11-tetramethyl-10-methoxy-2,7,11-tridecatrien-4-ynyl-oxy)-tetrahydropyran;
d,l-threo-trans,cis,trans-3,7,9,11-tetramethyl-10-methoxy-2,7,11-tridecatrien-4-yn-1-ol;
d,l-threo-trans,cis,trans-3,7,9,11-tetramethyl-10-methoxy-2,7,11-tridecatrien-4-yn-1-al; and
d,l-threo-trans,cis,trans-3,7,9,11-tetramethyl-10-methoxy-2,7,11-tridecatrien-4-ynoic acid.

EXAMPLE 36

By the procedure of Example 14, 15 and 16, d,l-threo-trans,cis,trans - 2 - (3,7,9,11-tetramethyl-10-methoxy-2,7,11-trideca-trien-4-ynyl-oxy)-tetrahydropyran is converted to d,l - threo - trans,cis,cis,trans - 3,7,9,11-tetramethyl-10-methoxy-trideca-2,4,7,11-tetraenoic acid methyl ester via the following intermediates:
d,l-threo-trans,cis,cis,trans-2-(3,7,9,11-tetramethyl-10-methoxy-trideca-2,4,7,11-tetraenyl-oxy)-tetrahydropyran;
d,l-threo-trans,cis,cis,trans-3,7,9,11-tetramethyl-10-methoxy-2,4,7,11-tridecatetraen-1-ol;
d,l-threo-trans,cis,cis,trans-3,7,9,11-tetramethyl-10-methoxy-2,4,7,11-tridecatetraen-1-al; and
d,l-threo-trans,cis,cis,trans-3,7,9,11-tetramethyl-10-methoxy-2,4,7,11-tridecatetraenoic acid.

We claim:
1. A compound of the formula:

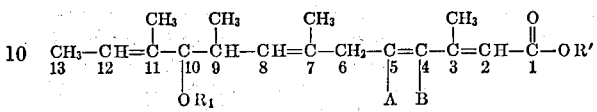

wherein R' is hydrogen or lower alkyl and A and B are individually hydrogen or taken together form a carbon to carbon bond and $R_1$ is lower alkyl or benzyl.

2. The compound of claim 1 wherein A and B taken together form a carbon to carbon bond.
3. The compound of claim 2 wherein said compound is d,l - erythro - trans,trans,trans 3,7,9,11 - tetramethyl-10-methoxytrideca-2,7,11-trien-4-ynoic acid.
4. The compound of claim 2 wherein said compound is d,l - erythro - trans,trans,trans - 3,7,9,11 - tetramethyl-10-methoxytrideca-2,7,11-trien-4-ynoic acid methyl ester.
5. The compound of claim 2 wherein said compound is d,l - threo - trans,trans,trans - 3,7,9,11 - tetramethyl - 10-methoxytrideca-2,7,11-trien-4-ynoic acid.
6. The compound of claim 2 wherein said compound is d,l - threo - trans,trans,trans - 3,7,9,11 - tetramethyl - 10-methoxytrideca-2,7,11-trien-4-ynoic acid methyl ester.
7. The compound of claim 1 wherein A and B are hydrogen with the double bond formed thereby having a cis configuration.
8. The compound of claim 7 wherein said compound is d,l-erythro - trans,cis,trans,trans - 3,7,9,11 - tetramethyl-10-methoxytrideca-2,4,7,11-tetraenoic acid.
9. The compound of claim 7 wherein said compound is d,l-erythro-trans,cis,trans,trans - 3,7,9,11 - tetramethyl-10-methoxytrideca-2,4,7,11-tetraenoic acid methyl ester.
10. The compound of claim 7 wherein said compound is d,l-threo-trans,cis,trans,trans - 3,7,9,11 - tetramethyl-10-methoxytrideca-2,4,7,11-tetraenoic acid.
11. The compound of claim 7 wherein said compound is d,l-threo-trans,cis,trans,trans - 3,7,9,11 - tetramethyl-10-methoxytrideca-2,4,7,11-tetraenoic acid methyl ester.
12. The compound of claim 1 wherein A and B are hydrogen forming a double bond having a trans configuration.
13. The compound of claim 12 wherein said compound is d,l-erythro - all-trans-3,7,9,11-tetramethyl-10-methoxytrideca-2,4,7,11-tetraenoic acid.
14. The compound of claim 12 wherein said compound is d,l-erythro - all - trans-3,7,9,11-tetramethyl-10-methoxy-trideca-2,4,7,11-tetraenoic acid methyl ester.
15. The compound of claim 12 wherein said compound is d,l-threo - all - trans-3,7,9,11-tetramethyl-10-methoxytrideca-2,4,7,11-tetraenoic acid methyl ester.
16. The compound of claim 12 wherein said compound is d,l-threo - all - trans-3,7,9,11-tetramethyl-10-methoxy-trideca-2,4,7,11-tetraenoic acid.

References Cited
UNITED STATES PATENTS 3,732,282   5/1973   Henrick et al.   260—465.9
3,637,674   1/1972   Jarolim et al.   260—240 R LEWIS GOTTS, Primary Examiner D. G. RIVERS, Assistant Examiner U.S. Cl. X.R.

260—413, 340.9, 345.9, 594 R, 602, 614 R, 615 A, 615 R; 424—312, 318, Dig. 12